United States Patent Office 2,772,165
Patented Nov. 27, 1956

2,772,165

METHOD OF MAKING A SILVER HALIDE EMULSION

Jerome Albert Moede, New Brunswick, N. J., assignor to E. I. du Pont de Nemours and Company, Wilmington, Del., a corporation of Delaware No Drawing. Application May 11, 1953,
Serial No. 354,410

9 Claims. (Cl. 96—114)

This invention relates to photography and more particularly to a process of removing soluble salts and water from water-permeable protein silver halide emulsions and especially gelatino silver halide emulsions.

Various methods are known for precipitating gelatino silver halide emulsions. Among such methods are precipitation with organic solvents, e.g., methyl alcohol, ethyl alcohol and acetone, salts of various inorganic anions, e.g., potassium ferrocyanide and ferricyanide, sodium tetraborate, trisodium phosphate, barium nitrate, ammonium bromide and potassium sulfate, trichloroacetic acid, anion soaps, higher alkyl sulfonic acids, higher alkyl sulfates, acid-insoluble organic resins containing carboxyl groups, and acid-insoluble gelatin derivatives. However, the conventional method used to remove soluble salts from the gelatino silver halide emulsion is to extrude the gelled emulsion into noodles and to wash the noodles vigorously in water. This method is time consuming.

Precipitation with organic solvents requires costly solvent recovery systems. Inorganic precipitating agents are required in large amounts and the anion soaps and wetting agents often have harmful effects on the photographic properties of the emulsion.

An object of this invention is to provide a new method of precipitating gelatino silver halide emulsions. Another object is to provide such a method which is simple and effective. Yet another object is to provide such a method which does not require chilling, noodling and extensive washing steps. A further object is to provide a method of precipitating emulsions and removing water-soluble salts that does not require costly apparatus. Still other objects will be apparent from the following description.

The novel processes of this invention, in their broader aspects, comprise admixing, in any order, an aqueous dispersion of silver halides in a water-permeable amphoteric reversible protein colloid, an aqueous solution of a water-soluble, acid-soluble, organic polymer of high molecular weight containing a plurality of recurring oxy groups and recurring acid or acid salt groups and an acid to lower the hydrogen ion concentration to a value below the isoelectric point of said protein and recovering the precipitate. The precipitate consists of an insoluble complex of the organic polymeric anion and the protein and entrapped protein and silver halides. Since it contains some soluble salts it is purified by elutriation. The organic polymer is ordinarily added in an amount of from 3% to 20% by weight of the protein present, the amount depending on variables which include the specific polymer and precipitation temperature. Higher amounts of the polymer than 20% of the protein may be used. The pH at which the precipitation occurs is dependent on variables which include the isoelectric point of the protein, the ratio of protein to water present in the emulsion, the concentration of soluble salts in the emulsion and the specific polymer. Ordinarily the range is pH 1.5 to 4.5.

By "water-soluble, acid-soluble organic polymer" is meant one of the above type which is soluble in water to the extent of at least 1% by weight and in 1% nitric acid to the extent of at least 1% by weight.

The oxy groups in the polymer may be alcoholic hydroxyl and acetal groups such as occur in polyvinyl acetals, or ether groups such as occur in alkylvinyl ether copolymers with maleic anhydride, or part of a ring structure such as in a polygalactan, e.g., carrageenin, etc. The acid groups in these polymers have at least one replaceable hydrogen atom and include carboxylic, sulfonic, sulfuric, phosphoric, phosphonic, and phosphinic acid groups. They may be added in the form of the free acids or in the form of a water-soluble salt, e.g., the sodium, potassium, or ammonium salts.

Redispersion of the silver halide can be carried out by raising the pH to about 6 to 7 by the addition of an alkaline compound, e.g., aqueous sodium or potassium hydroxide, sodium or potassium carbonate or other alkaline compound which does not have an adverse photographic effect. By accomplishing redispersion with a small amount of water a washed, high silver halide content emulsion can be obtained in a simple operation.

In the preferred aspect of the invention an aqueous gelatino-silver halide emulsion is precipitated by admixing with it, in any order, a water-soluble, acid-soluble acetal of an aldehyde containing a sulfonic acid group with polyvinyl alcohol or a partially hydrolyzed polyvinyl ester, said acetal being used in an amount from 3% to 20% by weight of the gelatin, and an acid to lower the pH to a value below the isoelectric point, removing the aqueous solution from the complex precipitate and washing said precipitate. The polyvinyl acetal and acid are preferably added from aqueous solution. The precipitate is then redispersed as described above.

Among the useful polyvinyl acetals containing sulfonic acid groups which can be used are those made from o-sulfobenzaldehyde, alpha- and beta-sulfonaphthaldehydes, beta-sulfopropionaldehyde, and polyvinyl alcohol or a partially hydrolyzed polyvinyl acetate, etc. Polyvinyl acetals of these types and their preparation are described in U. S. Patents 2,462,527, 2,609,290, and German Patent 643,650. They should contain sufficient acid groups to be acid-soluble.

Other specific water-soluble, acid-soluble polymers of high molecular weight containing oxy groups and carboxylic acid, sulfate or phosphate groups, include the sulfates of polygalactan, and the water-soluble, acid-soluble, methylvinylether/maleic anhydride copolymers, and the water-soluble, acid-soluble phosphate of polyglycidyl methacrylate. The salts, e. g., sodium, potassium and ammonium salts of these acids, as stated above, can be used initially. The above polymeric compounds generally will have molecular weights from 5,000 to 50,000 and in acid they must contain sufficient acid groups to confer the requisite solubility. These polymers can be substituted in like manner and in similar amounts for the specific compounds of the following examples with similar results.

The preparation of water-soluble, acid-soluble phosphates of polyglycidyl methacrylates is described in Jackson U. S. application Ser. No. 337,672, filed February 18, 1953.

The invention will be further illustrated but is not intended to be limited by the following examples.

*Example 1*

To 1800 grams of an unwashed photographic emulsion, containing 282 grams of silver halides composed of 1.5 mol percent iodide and 98.5 mol percent bromide, 50 grams of gelatin and soluble salts consisting of 2.2 mols of a mixture of potassium and ammonium bromides, acetates and nitrates, and adjusted to pH 6.3 at 80° F., was added 120 grams of a 5% aqueous solution of a water-soluble, acid-soluble partial acetal of polyvinyl alcohol and o-sulphobenzaldehyde at pH 6.5 and consisting of 5 grams of sulfonate sulfur per 100 grams of polymer. Seven hundred (700) cc. of 1 molar nitric acid at 80° F. was then added to the mixture to lower the pH to 2.0. The precipitate (an insoluble complex of the gelatin and the o-sulfobenzaldehyde polyvinyl acetal containing entrapped silver halides and gelatin) settled out as small discrete granular particles, and the supernatant liquid containing the said soluble salts was decanted. The precipitate was rinsed three times with 2 liters of water at 80° F. with stirring followed by decantation. The precipitate was redispersed by raising the pH to 6.5 with 1 molar sodium hydroxide and stirring for 15 minutes at 105° F. Additional gelatin was then added to the emulsion as a 20% liquor. The emulsion was then sensitized and digested in the normal manner to obtain optimum photographic properties and finally coated in the usual manner. The finished film was equivalent in photographic properties to one prepared using the same emulsion formula except for being washed in the conventional manner.

*Example II*

To 1830 grams of an unwashed photographic emulsion, containing 282 grams of silver halides composed of 1.5 mol percent iodide and 98.5 mol percent bromide, 80 grams of gelatin and soluble salts consisting of 2.2 mols of a mixture of potassium and ammonium bromides, acetates and nitrates, and adjusted to pH 6.3 at 80° F., was added at 80° F., three hundred and twenty (320) grams of a 5% aqueous solution of a water-soluble partial acetal of polyvinyl alcohol and o-sulphobenzaldehyde at pH 6.5 and containing 5 grams of sulphonate sulfur per 100 grams of polymer. Seven hundred (700) cc. of 1 molar nitric acid at 80° F. was then added to the mixture to lower the pH to 2.0. The precipitate (an insoluble complex of the gelatin and the o-sulfobenzaldehyde acetal containing entrapped silver halides and gelatin) was allowed to settle for ten minutes and the supernatant liquid containing the aforesaid salts decanted off. The granular precipitate was then rinsed three times with 2 liters of water at 80° F. with stirring followed by decantation. It was then redispersed by adjusting the pH to 6.3 with 1 molar sodium hydroxide and stirring at 105° F. for 15 minutes. Additional gelatin was then added to the emulsion as a 20% liquor. The resulting emulsion was then sensitized and digested in the normal manner to obtain optimum photographic properties and finally coated and dried on a film support. The finished film was equivalent in photographic properties to one prepared using the same emulsion formula except for being washed in the conventional manner.

*Example III*

To 900 cc. of an emulsion equivalent to the one described in Example I was added 7 molars nitric acid to adjust the pH to 2.0. To this emulsion at 70° F. was added a mixture of 1600 cc. of water at 80° F. and 60 grams of a 5% aqueous solution of the polyvinyl acetal described in Example I. The precipitate (an insoluble complex of gelatin and polyvinyl acetal containing entrapped silver halides and gelatin) was allowed to settle, rinsed and redispersed as previously described and then sensitized and digested in the normal manner. Finished coatings of the resulting emulsion were equivalent in photographic properties to the same emulsion washed in the conventional manner.

*Example IV*

To 73 cc. of an unwashed photographic emulsion at pH 7 and containing 11.3 grams of silver halides composed of 1.5 mol percent iodide and 98.5 mol percent bromide, 2.0 grams of gelatin and soluble salts consisting of 0.07 mol of a mixture of potassium and ammonium bromides, acetates and nitrates, was added 200 cc. of 120° F. tap water and 5 cc. of a 2% aqueous solution of carrageenin, a natural polysulfate of polygalactan having a 25–30% sulfate content. The pH was then decreased to 2.0 with nitric acid. The precipitate (an insoluble complex of gelatin and polysulfate containing entrapped silver halides and gelatin) settled out leaving a clear supernatant liquid. The temperature was approximately 100° F. The precipitate was then rinsed with water at 80° F. and redispersed by adjusting the pH above 5 and stirring above 90° F. The emulsion had a high solids content and after mixing with addition gelatin, the emulsion is useful for coating at high speeds.

*Example V*

To 80 cc. of an unwashed photographic emulsion containing 11.3 grams of silver halides composed of 1.5 mol percent iodide and 98.5 mole percent bromide, 2.0 grams of gelatin and soluble salts consisting of 0.07 mol of a mixture of potassium and ammonium bromides, acetates and nitrates and adjusted to pH 6.2, was added 10 cc. of a 2.5% aqueous solution of a water-soluble, acid-soluble copolymer of methylvinyl ether and maleic anhydride (specific viscosity=0.54). Thirty (30) cc. of 1.2 N HCl was then added to reduce the pH to 2.5. All reagents were mixed at a temperature of 70° F. Precipitation was rapid and precipitate was granular. The precipitate (an insoluble complex of the gelatin and said copolymer containing silver halides and entrapped gelatin) was rinsed with water to remove soluble salts and redispersed by adjusting the pH to 6.0 with sodium hydroxide and stirring above 90° F. It has properties and uses similar to that of Example IV.

Among the useful acids to lower the pH are strong mineral acids, e. g., nitric, sulfuric and hydrochloric acids. Other acids, such as acetic acid may be used as long as they are photographically inert and have a dissociation constant at least as great as acetic acid, in order to prevent the use of excessive amounts of acid.

The precipitated emulsions after washing can be redispersed and admixed with further gelatin or other water-permeable binding agents and emulsion adjuvants, e. g., hardening agents and sensitizers can be used.

The emulsions so precipitated, in accordance with the invention, may be silver chloride, silver bromide, silver chlorobromide, silver iodobromide, or composed of mixed silver halides which can be made in the usual manner from soluble halides and soluble silver salts. Additional water-permeable, amphoteric colloid binding agents for such halides that can be used in place of gelatin include albumin and casein.

An advantage of the use of the above water-soluble, acid-soluble polymers over alkali-soluble, acid-insoluble resins containing carboxylic acid groups is that a much smaller amount of the former is required. Thus, whereas the most practical results are obtained with the former by using amounts from 3 to 20% by weight, based on the weight of gelatin, the latter require over 30% for adequate precipitation. The alkali-soluble, acid-insoluble resins must be added above pH 6.5 and are precipitated at a pH of 4.5–5.5 and this is before conditions are such that the amphoteric protein colloid normally used in emulsion making will form a complex with them. The polymers used in accordance with this invention are soluble until the pH is low enough for them to form complexes with the amphoteric protein colloid, that is, at or below the isoelectric point of said colloid.

An advantage of the invention is that the process of precipitating the protein colloid and silver halides eliminates the necessity of chilling and noodling the emulsion prior to the removal of the soluble salts by washing. This conventional method of chilling, noodling and washing necessitates the use of large amounts of water. There are three primary objections to it. One is that the water used for washing has to be quite pure and free of contamination and this necessitates elaborate and costly filtering operations. The second objection is that the noodles take up a considerable amount of the wash water and require higher concentrations of gelatin than would normally be necessary if this water was not absorbed. Thus, when conventional washing methods are employed emulsions have to be made with at least a 4% gelatin content, whereas the instant process requires considerably less gelatin, e. g., of the order of 1.5 to 2.5%. In large manufacturing operations this involves considerable saving. The third objection is that the high water content of the conventionally washed emulsions mitigates against using higher coating speeds which in turn necessitate faster drying means. A further disadvantage of the conventional emulsion making method is that the silver nitrate solutions can only be used in limited concentration, that is the volume of solution must be kept small as determined by the gelatin content whereas in the instant process higher volumes and less concentrated solutions can be used since all the liquid is removed in the precipitation. This larger choice of solution volume may in turn allow greater control of photographic characteristics, i. e., grain size, etc.

A further advantage of the invention is that it allows one to make gelatin emulsions with low gelatin content since substantially all of the water used in making the emulsion is removed from the precipitated emulsion. Since practically no solvent is required for redispersion, the gelatin concentration for coating can be easily controlled by the addition of water. When noodled emulsions are washed by the conventional procedure the minimum concentration required for proper setting of the emulsion is approximately 4 percent. In order to maintain this percentage as well as the silver halide/gelatin ratio required for the finished film, the formulae and procedures are sometimes hampered by serious operational limitations. During the conventional washing operation the water content of the emulsion is increased while substantially all of the water can be removed by precipitation. This offers the simple means of increasing the solids content of the emulsion after they have been made. Thus, one can obtain emulsions that have a higher silver halide/gelatin ratio than those obtained with emulsions which have been washed by the conventional method.

Still other advantages will be apparent from the above description of the invention.

What is claimed is:

1. A process which comprises admixing, in any order, an aqueous dispersion of light-sensitive silver halide in a water-permeable amphoteric protein protective colloid and an aqueous solution containing from 3% to 20% by weight, based on said colloid, a water-soluble, acid-soluble organic polymer of high molecular weight taken from the group consisting of polyvinyl acetals, alkylvinyl ether/maleic anhydride copolymers, polygalactans and phosphates of polyglycidyl methacrylates containing a plurality of recurring oxy groups selected from the group consisting of ether, acetal, and alcoholic hydroxyl groups and recurring groups taken from the class consisting of free acid groups and their alkali metal and ammonium salts, said polymer being soluble both in water and 1% nitric acid to the extent of at least 1%, by weight, and being capable of forming a complex with an amphoteric protein colloid below its isoelectric point, admixing an acid to lower the pH below the isoelectric point of such colloid thereby forming a complex of the polymer and said colloid and recovering the percipitated complex of said polymer and colloid containing dispersed silver halide.

2. A process which comprises admixing in any order, an aqueous dispersion of light-sensitive silver halide in gelatin and an aqueous solution containing from 3% to 20% by weight, based on said colloid, of a water-soluble, acid-soluble organic polymer of high molecular weight taken from the group consisting of polyvinyl acetals, alkylvinyl ether/maleic anhydride copolymers, polygalactans and phosphates of polyglycidal methacrylates containing a plurality of recurring oxy groups selected from the group consisting of ether, acetal, and alcoholic hydroxyl groups and recurring groups taken from the class consisting of free acid groups and their alkali metal and ammonium salts, said polymer being soluble both in water and 1% nitric acid to the extent of at least 1% by weight and being capable of forming a complex with gelatin below its isoelectric point, admixing an acid to lower the pH below the isoelectric point of the gelatin thereby forming a complex of the polymer and said gelatin, and recovering the precipitated complex of said polymer and gelatin containing dispersed silver halide.

3. A process as set forth in claim 2 wherein said polymer is carrageenin.

4. A process as set forth in claim 3 wherein said polymer is a water-soluble, acid-soluble poly(methylvinyl ether co maleic anhydride).

5. A process which comprises admixing, in any order, an aqueous dispersion of light-sensitive silver halides in gelatin, an aqueous solution containing a water-soluble, acid-soluble polyvinyl acetal containing a plurality of vinyl alcohol groups and sulfonic acid groups, said polyvinyl acetal being soluble both in water and 1% nitric acid to the extent of at least 1% by weight, admixing an acid to lower the pH below the isoelectric point of such gelatin, washing the precipitated complex of said acetal and gelatin containing silver halides, and recovering the precipitate.

6. A process which comprises admixing, in any order, an aqueous dispersion of light-sensitive silver halides in gelatin, an aqueous solution containing a water-soluble, acid-soluble, o-sulfobenzaldehyde polyvinyl acetal containing a plurality of vinyl alcohol groups, said polyvinyl acetal being soluble both in water and 1% nitric acid to the extent of at least 1% by weight, admixing an acid to lower the pH below the isoelectric point of such gelatin, washing the precipitated complex of said acetal and gelatin containing silver halides and recovering the precipitate.

7. A process which comprises admixing, in any order, an aqueous dispersion of light-sensitive silver halides in gelatin, an aqueous solution containing a water-soluble, acid-soluble, o-sulfobenzaldehyde polyvinyl acetal containing a plurality of vinyl alcohol groups, said polyvinyl acetal being soluble both in water and 1% nitric acid to the extent of at least 1% by weight, admixing an acid to lower the pH below the isoelectric point of such gelatin, washing the precipitated complex of said acetal and gelatin containing silver halides and redispersing said precipitate by admixing it with an aqueous alkaline solution.

8. A process which comprises admixing, in any order, an aqueous dispersion of light-sensitive silver halides in gelatin, an aqueous solution containing a water-soluble, acid-soluble, o-sulfobenzaldehyde polyvinyl acetal containing a plurality of vinyl alcohol groups, said polyvinyl acetal being soluble both in water and 1% nitric acid to the extent of at least 1% by weight, admixing an acid to lower the pH below the isoelectric point of such gelatin, washing the precipitated complex of said acetal and gelatin containing silver halides and redispersing said precipitate by admixing it with an aqueous alkali metal hydroxide solution.

9. A process as set forth in claim 8 wherein said acid is nitric acid and said metal hydroxide is sodium hydroxide.

References Cited in the file of this patent

UNITED STATES PATENTS

| 2,281,703 | Lowe | May 5, 1942 |
| 2,358,836 | Swan | Sept. 26, 1944 |
| 2,401,051 | Crouse et al. | May 28, 1946 |

FOREIGN PATENTS

| 648,472 | Great Britain | Jan. 3, 1951 |